G. A. LAMBERT.
STIRRING COOKER.
APPLICATION FILED APR. 27, 1917.
1,303,333.
Patented May 13, 1919.
2 SHEETS—SHEET 2.
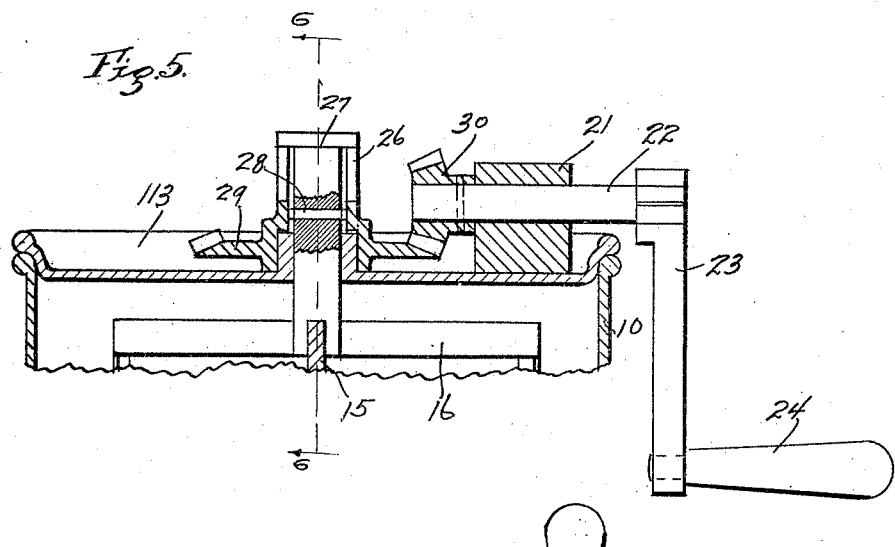
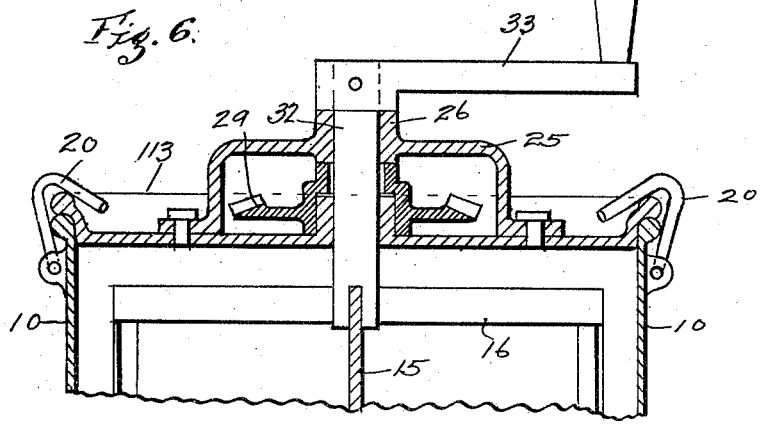
Inventor
GEORGE A. LAMBERT
By
Attorneys.

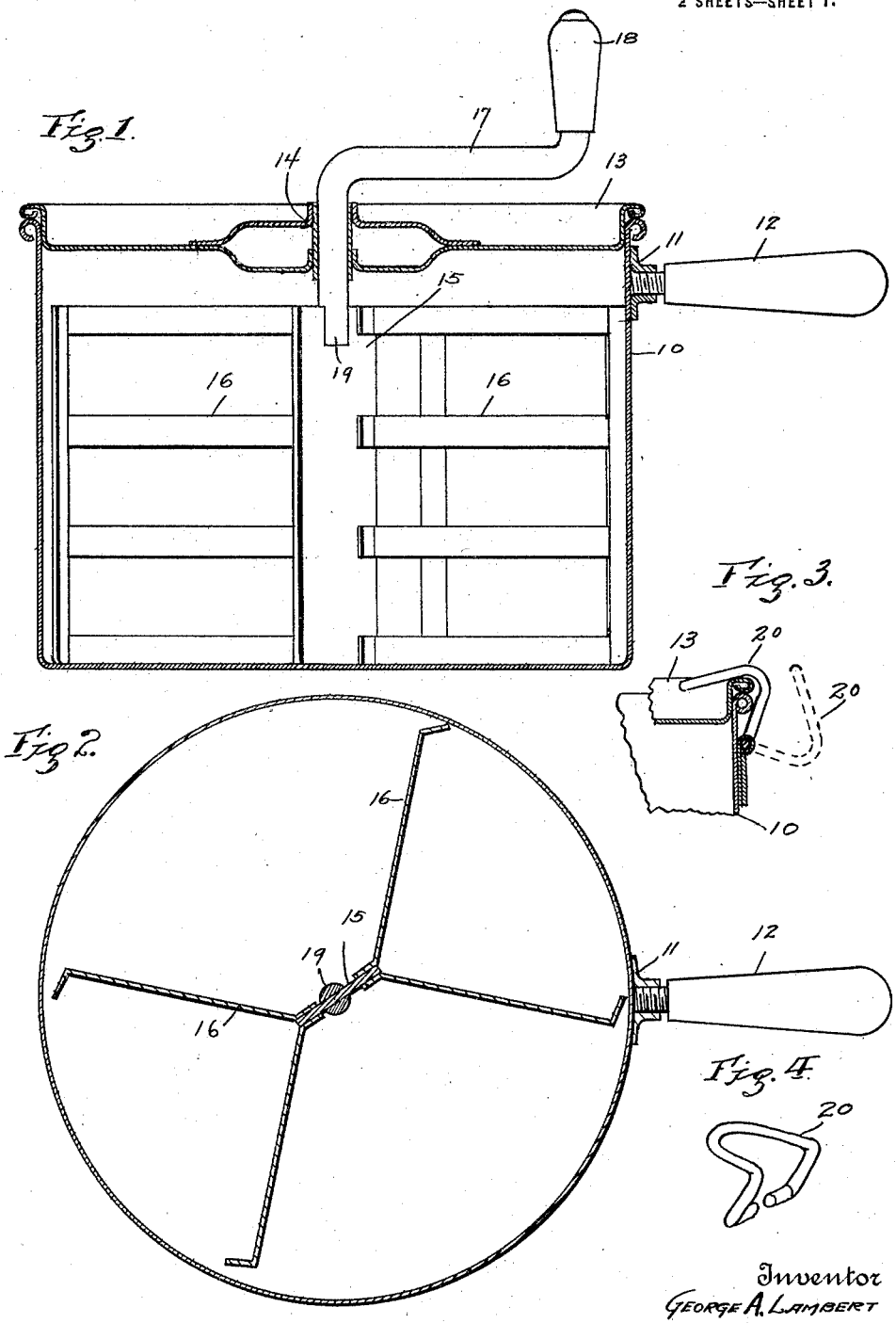

UNITED STATES PATENT OFFICE.

GEORGE A. LAMBERT, OF ANDERSON, INDIANA.

STIRRING-COOKER.

1,303,333.  Specification of Letters Patent.  Patented May 13, 1919.

Application filed April 27, 1917. Serial No. 164,856.

*To all whom it may concern:*

Be it known that I, GEORGE A. LAMBERT, a citizen of the United States, and a resident of Anderson, county of Madison, and State of Indiana, have invented a certain new and useful Stirring-Cooker; and I do hereby declare that the following is a full, clear, and exact description thereof, reference being had to the accompanying drawings, in which like numerals refer to like parts.

This invention relates to a cooking utensil and particularly to a stirring cooker adapted to be used for cooking those foods which must be thoroughly stirred or mixed during the cooking process. The construction of this cooker being such that it may be adapted for home use in cooking small quantities of food or may be very conveniently used in preparing large quantities of food which cannot be properly cooked by hand stirring.

One of the main features of this invention is the stirring element which is so constructed that it will engage and scrape the side walls of the receptacle, and also the bottom thereof. This enables the entire contents of the can to be stirred and prevents layers thereof from clinging to the walls and becoming burned by the heat. This is accomplished by permitting the stirring element to rest freely within the container without being pivoted in one certain position, whereby its stirring motion or revolving motion will at all times be put in engagement with the wall of said container. The stirring element is laterally slidable in the handle for driving it, so it can shift into engagement with one side or other of the can or container.

Another feature of the invention consists in providing the cooker with a removable stirring handle and holding handle whereby they may be quickly and easily removed therefrom or assembled so that the outfit may be conveniently installed in a fireless cooker or the like or handled and packed for shipment.

Another feature of the invention is the combination lifting handles and lid clamping means which in one position provide handles for lifting the cooker and in another position engage and clamp the lid securely on the top thereof.

The full nature of the invention will be understood from the accompanying drawings and the following description and claims:

Figure 1 is a central vertical cross section through the cooker. Fig. 2 is a cross section taken on the line 2—2 of Fig. 1. Fig. 3 is a cross section through a portion of the cooker showing the clamping handles. Fig. 4 is a perspective view of one of the clamping handles. Fig. 5 is a central vertical cross section through the upper portion of the cooker showing a modified form thereof. Fig. 6 is a cross section of a modified form taken on the line 6—6 of Fig. 5.

In the drawings there is shown a cooker or container 10 on the upper side of which is secured a member 11 into which a handle 12 may be screwed in or out for holding or lifting the cooker while in use. When it is desired to place the cooking outfit in a fireless cooker or the like or arrange it for packing and shipping the handle 12 and crank 17 may be removed therefrom. For covering the cooker so as to retain the contents and heat therein there is a lid 13 which fits snugly over the top thereof and is provided with a bearing 14 in the center.

For stirring the contents of the cooker during the cooking operation there is a stirring member 15. The stirring member 15 is provided with a plurality of substantially radially disposed arms 16. The diameter of the stirring element is slightly less than the inside diameter of the cooker whereby only one side of said element may engage and scrape the wall of the cooker at the same time. The stirring element is contained loosely within the cooker so that its center is free to oscillate within a certain radius about the center of the cooker, thereby permitting one side of the stirring element to engage the wall of the cooker while the other side disengages the wall and vice versa during the stirring or revolving movement thereof and has its bearing across the bottom of the cooker so as to thoroughly scrape it and prevent the burning of the contents therein. By means of this action of the stirring element the walls and bottom are scraped so as to prevent any accumulation of the food thereon and prevent its being burned while at the same time there is no danger of the stirring element expanding by the heat so as to jam and mutilate the wall as would be the case if it were pivoted in a given position and its arms extended to engage the wall. Also if it were pivoted or secured in the cooker so as not to jam or mutilate the wall, the walls would ordinarily not be engaged for scraping off the contents contained therein.

For operating the stirring element there is provided a crank 17 adapted to extend through and be turned in the bearings 14 of the lid. The upper end of the crank 17 is provided with a handle 18 by which it may be operated, and the lower end is provided with flanges 19 adapted to straddle and engage loosely the stirring element 15 so as to be readily removable therefrom and whereby the stirring element can have lateral movement to bring it into engagement with one side or the other of the can, container or cooker. On the outer opposite sides of the cooker there are clamping lines in Fig. 3 to form means for lifting the cooker, and when turned in clamping position will engage and securely clamp the lid 13 on to the top of the cooker.

If it is desired to operate the stirring cooker for stirring and cooking foods in large quantities, and especially when the contents become thickened and heavy there is provided a specially constructed lid 113 on which is mounted a bearing 21 through which a shaft 22 extends adapted to be driven by a crank arm 23 having a handle 24 on the end thereof. The lid 113 is provided with a central frame 25 having a bearing 26 in the center thereof through which a shaft 27, similar to the shaft 19 may be inserted, which shaft is provided with a pin 28 extending diametrically therethrough so as to be engaged in a key way in the hub of a beveled gear 29. The beveled gear 29 is adapted to mesh with the beveled gear 30 mounted on the end of the shaft 22 whereby the stirring element may be operated by turning the crank 23. By providing the above construction the stirring leverage is increased by the ratio of the gears 29 and 30 so that a large quantity of comparatively stiff mixture may be easily stirred, but when a light mixture or small amount is being cooked a direct drive may be used by removing the shaft 27 and inserting in place thereof the shaft 32 having the crank arm 33 secured thereon, which is provided with a handle 34 as shown in Fig. 6. The cookers shown in Figs. 5 and 6 are, therefore, adapted for cooking large quantities of food in bulk while that shown in Fig. 1 is for home use where a small quantity is necessary.

The invention claimed is:

1. A stirring device including a container, a stirring element loosely disposed within said container so that it may shift laterally to engage and disengage the inner surface of said container, and means for driving said stirring element which permits such shifting movement thereof.

2. A stirring device including a container, a stirring element of less diameter than the container, and means with which the stirring element is in laterally slidable engagement for driving the same.

3. A stirring device including a container, a stirring element loosely disposed therein so that it may engage or disengage the inner surface thereof for scraping the contents therefrom, and a relatively fixed shaft with which said stirring element is in laterally slidable engagement for driving the same.

4. A stirring device including a container, a stirring element loosely disposed therein so that it may be laterally movable to engage and to disengage the surface of the container, and an actuating shaft fitting loosely astride the upper part of said stirring element for turning the same and at the same time permitting lateral movement of the stirring element.

5. A stirring device including a container, a lid, a stirring element loosely disposed within the container and of less diameter than the container, and a shaft mounted in said lid with the inner end of which the stirring element is in slidable engagement whereby it will be turned or permitted to have lateral play.

In witness whereof, I have hereunto affixed my signature.

GEORGE A. LAMBERT.

Copies of this patent may be obtained for five cents each, by addressing the "Commissioner of Patents, Washington, D. C."